United States Patent

[11] 3,583,566

[72] Inventors  Mikhail Yakovlevich Meshengisser
ulitsa Sumskaya 126, kv. 5.;
Ivan Semenovich Ermakov, prospekt
Pravdy, 7, kv. 44; Georgy Mikhailovich
Kochkin, ulitsa 23 Avgusta, 29, kv. 161;
Filipp Nikolaevich Shakhov, ulitsa
Chaikovskogo, 25, kv,23; Gennady
Georgievich Kotlyarov, Moskovsky
prospekt, 219/35, kv. 8.; Dmitry
Danilovich Sheljubsky, ulitsa 23 Avgusta,
29, kv. 69; Vladimir Petrovich
Sabbatovsky, ulitsa Bondarevskaya, 14/16,
kv.15; Vladislav Alexeevich Egorov,
prospekt Ilicha, 101, kv.10, all of,
Kharkov, U.S.S.R.
[21] Appl. No.  862,371
[22] Filed  Sept. 30, 1969
[45] Patented  June 8, 1971

[54] FILTER PRESS
4 Claims, 2 Drawing Figs.

[52] U.S. Cl. ............................................. 210/225,
210/230
[51] Int. Cl. ........................................... B01d 25/12
[50] Field of Search ........................................ 100/198;
210/225, 229, 230

[56] References Cited
UNITED STATES PATENTS

| | | | |
|---|---|---|---|
| 643,022 | 2/1900 | Wilson | 210/225 |
| 988,854 | 4/1911 | Bixler | 210/229 |
| 3,121,681 | 2/1964 | Baxter | 210/225X |
| 3,342,123 | 9/1967 | Ermakov et al | 210/225X |
| 3,347,383 | 10/1967 | Augerot | 210/225 |
| 3,390,772 | 7/1968 | Juhasz | 210/225X |

Primary Examiner—J. L. Decesare
Attorney—Waters, Roditi, Schwartz & Nissen

ABSTRACT: A filter press comprises filter plates disposed horizontally, a device adapted to press the filter plates against one another and a support net arranged in a zigzag manner between the plates. Replaceable paper filter tapes are disposed above the support net on the horizontal parts thereof and the paper tapes and support net can be advanced when the press is open to remove the replaceable paper tapes and replace the same with fresh tape. The filter press is designed to filter low-concentrated suspensions in which the concentration of the solid phase is less than 5 g.p.l. and which form precipitate layers that are less than 5 mm. thick.

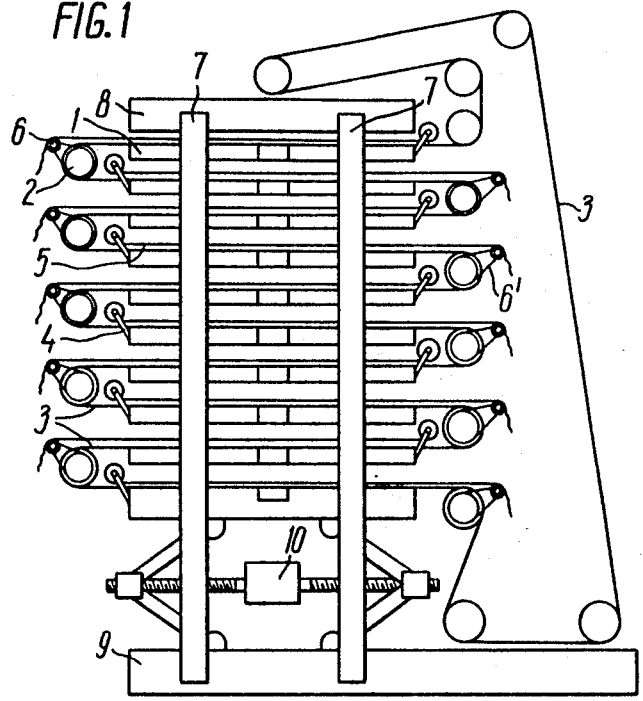
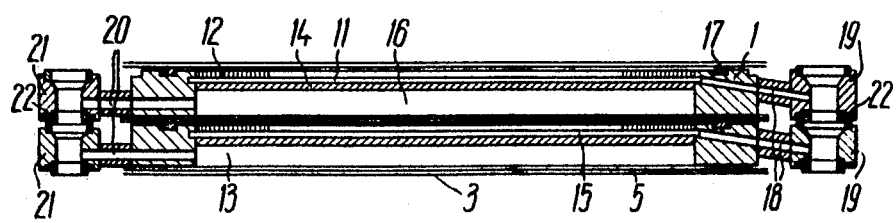

FILTER PRESS

The present invention relates to equipment used for effecting filtering processes, and, more particularly, to filter presses used for filter suspensions.

Known in the art is a filter press for filtering suspensions, which comprises a plurality of filter plates disposed horizontally, and a filtering partition arranged in a zigzag manner between the plates and resting upon rollers secured on the latter. The filter press is equipped with a device used for pressing the filter plates against one another and for disconnecting them. The filter plates each consist of an upper part and a lower part and the upper parts are disposed below the filtering partition and are used to confine chambers for draining the filtrate, while the lower parts are disposed above the filtering partition and are used to confine chambers into which suspension is supplied.

The supply of suspension to be filtered and the draining of the filtrate are effected respectively through an inlet and an outlet made in the plates, the filtering being carried out with the plates compressed. Suspension is supplied under pressure into the lower part of a plate and farther through the filtering partition into the upper part of a next lower plate. As a result of this, a precipitate is formed on the filtering partition upper surface, whereupon the plates are separated, and a drive for moving the filtering partition is actuated to carry the precipitate away from the interplate space; the precipitate being removed from the partition partly when the filtering partition passes around the rollers, and partly by scrapers secured in close proximity to the rollers.

However, such construction of a filter press does not make it possible to filter suspensions in which the concentration of the solid phase is less than 5 g.p.l., and which form layers of the precipitate that are less than 5 mm. thick, as the latter cannot be removed in the course of displacement of the filtering partition.

It is an object of the present invention to provide a filter press in which the filtering partition can be easily removed from the interplate space and does not require any regeneration, and, hence, makes it possible to filter suspensions forming, in the course of the filtering thereof, a layer of the precipitate which is less than 5 mm. thick.

In accordance with the aforesaid and other objects the subject matter of the invention lies in employment of a filter press comprising filter plates disposed horizontally and consisting of upper and lower parts, the upper parts being used to confine chambers into which filtrate is supplied, and the lower parts being used to confine chambers into which suspension is supplied; means to press said filter plates against one another and to separate them; rollers secured on the filter plates; a support net resting on said rollers and arranged in a zigzag manner between the filter plates; replaceable paper filter tapes placed above the support net on the horizontal parts thereof; means for draining filtrate from the upper portions of the filter plates and means for supplying suspension into the lower parts of the filter plates.

Provision is made for means for feeding paper filter tape onto the support net mounted at the points where the support net enters the filter plates and between the branches of the net, and for means for removing the spent paper filter tape from the support net mounted at the points where the net exits from the filter plates. The device for removing the spent paper filter tape from the support net may be fashioned as a roller operatively connected to the roller mounting said support net.

The following description of an exemplary embodiment of the present invention is given with reference to the accompanying drawing, in which:

FIG. 1 shows diagrammatically a filter press, according to the invention;

FIG. 2 shows a sectional view of two contiguous filter plates in a compressed state, according to the invention.

The filter press according to the invention comprises a plurality of filter plates 1 (FIG. 1) which are disposed horizontally. Secured on the filter plates 1 are rollers 2 having a support net 3 resting thereon and arranged in a zigzag manner in-between the filter plates 1. Also arranged on the filter plates 1 and between the branches of the support net 3 are devices 4 carrying rolls of a paper filter tape 5, which are fashioned, in accordance with the present embodiment, as brackets fixed on plates 1. The filter tapes 5 are disposed on horizontal parts of the support net 3 which together with the filter tape 5 forms a filtering partition. To ensure easy removal of the paper filter tape 5 off the support net 3, the filter plates 1 are provided with rollers 6 secured thereon and operatively connected with the rollers 2, for instance, by means of a chain drive 6' diagrammatically shown in the drawing.

The filter plates 1 are capable of upwards and downwards displacement along guides 7 which are connected to plates 8 and 9. The filter plates 1 are moved and pressed against one another by means of a clamping device 10, preferably of electromechanical type, which ensures fast closing and opening of the filter press. Each filter plate 1 consists of two parts: an upper part 11 (FIG. 2) covered with a drainage sieve 12, and a lower part 13, which parts are separated from each other by a hermetic partition 14.

With the plates 1 tightly pressed against one another, the upper parts 11 and the support net 3 with the filter tape 5 confine chambers 15 into which filtrate is supplied, whereas the lower parts 13 and the support net 3 with the filter tape 5 confine chambers 16 into which suspension is delivered.

Placed in grooves of the upper parts 11 of plates 1 are sealing members 17. The chambers 15 are communicated by ducts 18 with pipe branches 19, and the chambers 16 by ducts 20 with pipe branches 21. Provided between the pipe branches 19, as well as between the pipe branches 21, are gaskets 22 which provide hermetic seals, upon compression of the plates 1, of the ducts used for delivering filtrate and supplying suspension. The filter press may be controlled by an electrohydraulic automatic device, or an automatic device of any other type.

The filter press operates as follows:

To start the filter press, the drive of the clamping device 10 is actuated on to press the filter plates 1 together as a result of which the chambers 15 and 16 (FIG. 2) are confined.

With a predetermined force of compression ensuring hermetic sealing of the chambers 15 and 16, the drive of the clamping device 10 is deactivated, and the delivery of suspension is started through the pipe branches 21 into the chambers 16. Filtrate is passed through the support net 3 and the paper filter tape 5 into the chamber 15 while a precipitate is formed on the upper surface of the filter tape 5, and the filtrate is drained through a manifold confined by the pipe branches 19.

With the rate of the filtering reduced to a certain limit, the supply of the suspension is discontinued, and compressed air is supplied through the pipe branch 21 to force out the remaining suspension and dry the precipitate formed on the paper filter tape 5. Thereupon, the filter press is opened, and the drive (not shown in the drawing) for moving the support net 3 is actuated. While moving, the support net 3 carries a used portion of the paper filter tape 5 away from the interplate space of the filter press and a clean portion of the filter tape 5 is simultaneously fed from the rolls over the support net 3. The rotating rollers 6 separate the filter tape 5 from the support net 3 and drop it into receiving hoppers (not shown in the drawing) disposed at both sides of the filter press. With the filter tape changed, the cycle of the filter press operation is repeated.

The proposed filter press makes it possible to filter low-concentrated suspensions, emulsions and oils, in which the concentration of the solid phase is less than 5 g.p.l. and which form precipitate layers that are less than 5 mm. thick and can generally not be removed from the filtering partition. The filter press has small overall dimensions and provides for a completely automatic process of filtering.

What we claim is:

1. A filter press comprising a plurality of horizontally disposed longitudinal filter plates each including upper and lower parts, the upper parts confining chambers into which filtrate is delivered, and the lower parts confining chambers into which suspension is supplied; means for pressing said filter plates against one another and for separating them; rollers secured to said filter plates; a support net resting on said rollers and arranged in a zigzag manner between the lower part of each plate and the upper part of the next lower plate; replaceable paper filter tapes placed above said support net on the horizontal parts thereof between the plates; means for draining filtrate from said upper parts of the filter plates, means for supplying suspension to said lower parts of the filter plates; the filtering taking place with said plates compressed, suspension being delivered into said lower part of each plate, filtrate passing through said paper filter tape and said support net into the upper part of the next plate disposed therebelow while a precipitate is formed on the upper surface of the filter tape, means for feeding the paper tape onto the support net, the latter means being mounted at the locations where the support net enters into said filter plates and between opposite branches of the zigzag support net, and means for removing the spent paper tape from the support net, the latter means being mounted at the locations where said support net exits from said filter plates.

2. A filter plate according to claim 1 in which said means for removing the spent paper filter tape from said support net comprises a roller.

3. A filter plate according to claim 2 comprising means drivingly connecting the rollers for removing the spent tape with the rollers supporting the support net.

4. A filter plate according to claim 2 comprising a hermetic partition separating the upper and lower parts of each plates.